Patented May 31, 1938

2,119,461

UNITED STATES PATENT OFFICE 2,119,461

PROCESS OF TREATING CREAM FOR BUTTER MAKING

Harold Eugene Kistner, Sabetha, Kans.

No Drawing. Application July 31, 1934,
Serial No. 737,812

2 Claims. (Cl. 99—60)

This invention relates to a process of treating cream and the general object is to provide means for bleaching cream whereby the deep yellow color of certain kinds of butter is greatly reduced or eliminated, this deep yellow color being extremely distasteful to many users.

My process is based on the fact that carotin, which is the principal coloring matter of butter, is de-colorized or bleached by the addition thereto of a gas such as hydrogen or carbon dioxide, carotin losing its color on the introduction of sixteen atoms of hydrogen, for instance, to the molecule.

In carrying out my process with sweet cream I pass the cream through a tube, containing finely divided platinum black, copper, iron, nickel, or other heavy metallic catalyzers of like adsorptive power, tho platinum black is preferred as it does not re-act with the chemical elements found in the cream. Prior to the submission of the cream to the action of the catalyzing element or simultaneously therewith, I introduce into the cream carbon dioxide, hydrogen, oxygen, or other gases which will react with the carotin. Instead of this process as above outlined, I may treat the cream, into which hydrogen or carbon dioxide has been formed or introduced, with ultra violet light which acts as a catlytic agent, this treatment being carried on for a period of time depending upon the consistency of the cream and its volume. In either case the gas re-acts and combines with the carotin of the cream so as to cause lightening of the color present.

Sour cream may be treated by first neutralizing the cream, as by carbonate of soda, which produces carbon dioxide, and the carbon dioxide so produced will re-act with the carotin or other yellow pigments in the presence of a catalyzing agent such as finely divided metals heretofore stated, or ultra violet light.

Hydrogen or other gases may be used, but I prefer to use carbon dioxide because of the natural carbon dioxide content of the cream. Carbon dioxide seems to have a great tendency to combine with the carotin since only small amounts are required to perform the reaction.

Another advantage in using carbon dioxide is that it does not re-act with the other fatty materials of the butter while other gases are liable to cause rancidity in the butter made from the cream or otherwise change the composition of the butter.

Upon churning cream so treated, the butter will be much lighter in color than butter from untreated cream, the product being not unlike the normally light colored butter of the winter months produced from sun-cured forage, in which this re-action has taken place in the forage before being eaten. Butter produced in accordance with my invention does not have the peculiar gray color characteristic of butter to which a green pigment has been added to cover up the high color, which pigment absorbs most of the light, making it apparently gray. In contrast, butter treated in accordance with my invention appears more nearly white. It will be noted that it is not necessary to use ultra violet light as a catalytic agent, but that any catalytic agent which has the power of producing conditions which will cause the gases to combine with the carotin found in butter, may be used. In this respect this invention differs from other irradiation processes, the irradiation by ultra-violet light, in this present case being only one of several means of producing a butter product light in color and which has essentially the same color consistency of butter produced during the winter months while the dairy herd are living on cured forage.

While I have heretofore referred to the irradiation of cream by the use of ultra violet light, the ultra violet light being used as a catalytic agent, it is to be understood that I may use the solar spectrum for this purpose, the process of photo-syntheses and bleaching being carried on in sunlight as in nature.

It is to be further understood that this product may be produced within the purview of my invention by any catalytic agent which possesses like powers in the adsorption or production of gases which will combine with the carotin or other yellow pigments found in natural butter. Such catalytic agents are, in addition to platinum, copper, iron, and nickel, cobalt and charcoal.

The tube or like element which contains the finely divided platinum black or other catalytic agent, may be made of chrome steel as this does not readily re-act with the cream when sour. The tube, however, might be made of glass or of quartz where ultra violet light is to be used as a catalytic agent. Any other suitable irradiation apparatus might be used such as an arc lamp in the center of a cylinder, with cream running down the cylinder on the inside thereof and thus passing in a very thin sheet over the inner surface of the cylinder while the ultra violet rays reach every small particle of it as it passes by.

Any apparatus which will contain the finely divided catalytic agent such as copper, platinum, etc. may be used provided it will allow the cream to filter through the catalytic agent and thus be brought into intimate contact therewith. This might be in the form of a vat or tank using a relatively deep layer of granular catalytic material with charcoal or gravel below and the cream being passed downward through this bed of catalytic material and through the charcoal. Such an apparatus might be used either under pressure or with a vacuum.

I have found that the amount of carbon dioxide which will be taken up by the cream at atmospheric pressure on the cream being agitated while the gas is being introduced is amply sufficient for the purpose of treating the cream. The catalytic materials are very efficient, and it takes only a relatively small amount of these materials to produce the re-action. When ultra-violet rays are used these will complete the reaction while the cream is passing down the side of the tube or cylinder as mentioned above.

In bleaching the carotin of butterfat, it must be remembered that the reaction takes place within the fat globule. It has been known for a long time that this bleaching could be accomplished by strong oxidizing agents but under these circumstances the fatty materials, which are also subject to oxidation, were acted upon so that it produced a rancid product, or in other words, a product that was unsalable. This bleaching action by strong oxidizing agents caused a tallowy decomposition in the butter and this tallowy decomposition produces a product which is not salable. Thus chlorine or hydrogen peroxide used as a bleaching agent will cause this tallowy decomposition if placed in the cream or butter in proportions which will bleach the pigments, but this method of bleaching the butter has never been practically used because it will ruin the butter. I have discovered that by the use of a catalyst agent and by the use of certain specified gases, I can secure a hurried or rapid reaction which affects the carotin within the fat globule and which bleaches the carotin without the attendant evils present in the slower process of natural oxidation, which natural oxidation will cause an oxidation of the fatty materials also. In all my experiments leading up to this present invention, I have never found any noticeable traces of oxidation of these fatty materials when my present process is used. I produce the desired color change without any tallowy decomposition which is present where other processes are used. I prefer to use finely divided platinum as the catalyst agent since platinum does not react with the materials of the cream and the cream in passing over it contacts with a maximum of surface so that the reaction is very rapid within the fat globule but without appreciably affecting in any way the fatty materials. As soon as the cream is passed on beyond the platinum, the reaction is stopped. I also prefer to use carbon dioxide or hydrogen since these gases will not react with the free fatty acids.

I claim:

1. A process of treating cream for butter making, which includes subjecting the cream, in the presence of a catalytic adsorbent, to the action of carbon dioxide gas to thereby effect the bleaching of the carotin in the cream.

2. A process of treating cream for butter making which includes subjecting the cream, in the presence of finely divided platinum as a catalyst, to the action of carbon dioxide to thereby effect the bleaching of the carotin in the cream.

HAROLD EUGENE KISTNER.